2 Sheets—Sheet 1.
R. C. HINTON.
Broom-Corn Harvesters and Thrashers.
No. 158,638. Patented Jan. 12, 1875.
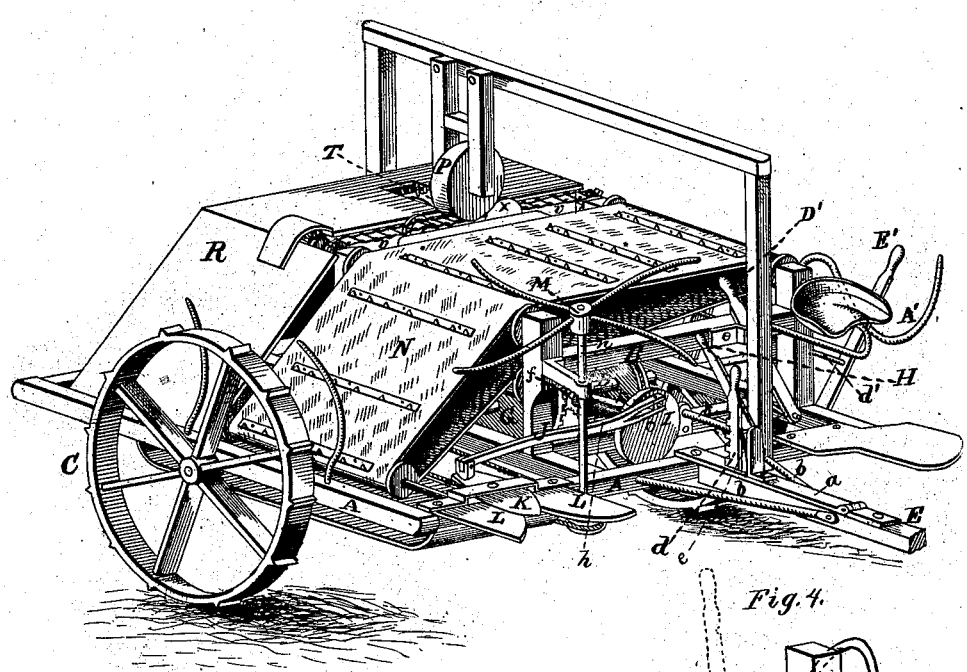
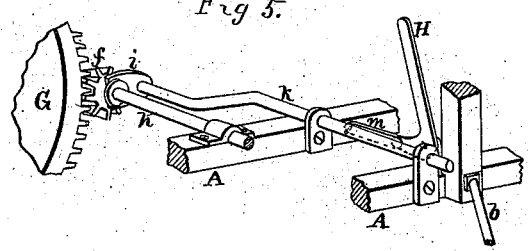
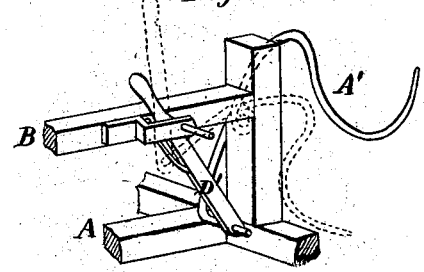
Witnesses.
Henry N. Miller
H. F. DuHamel
Inventor.
Robert C. Hinton
Per H. S. Abbot.
Attorney R. C. HINTON.
Broom-Corn Harvesters and Thrashers.

No. 158,638. Patented Jan. 12, 1875.

Witnesses:
Henry N. Miller
H. K. Du Hamel

Inventor:
Robert C. Hinton.
Per H. S. Abbot.
Attorney

UNITED STATES PATENT OFFICE.

ROBERT C. HINTON, OF CLINTON, MISSOURI.

IMPROVEMENT IN BROOM CORN HARVESTERS AND THRASHERS.

Specification forming part of Letters Patent No. 158,638, dated January 12, 1875; application filed May 26, 1874.

*To all whom it may concern:*

Be it known that I, ROBERT C. HINTON, of Clinton, county of Henry and State of Missouri, have invented certain new and useful Improvements in Broom-Corn Harvester and Thrasher, of which the following is a specification:

The nature of my invention consists in the construction and arrangement of a broom-corn harvester and thrasher, as will be hereinafter more fully set forth.

Figure 2:
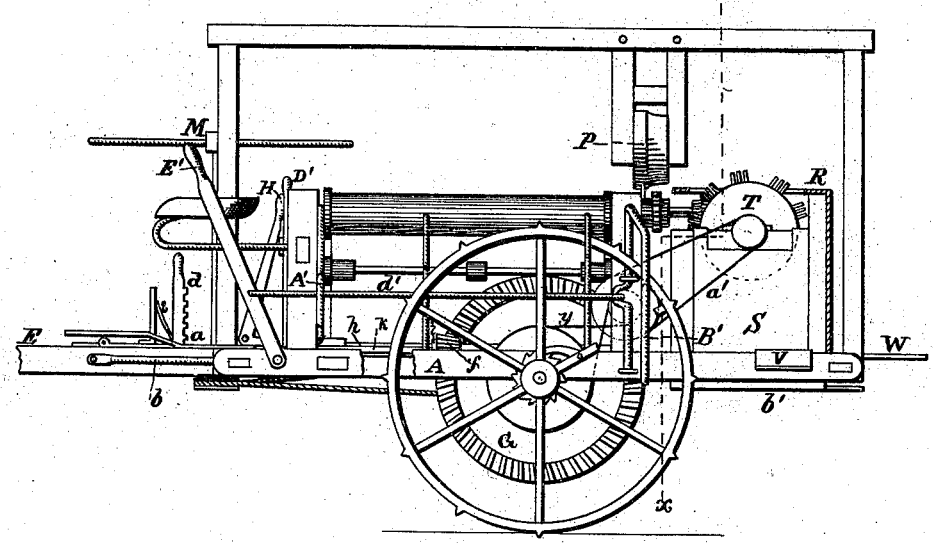
Figure 3:
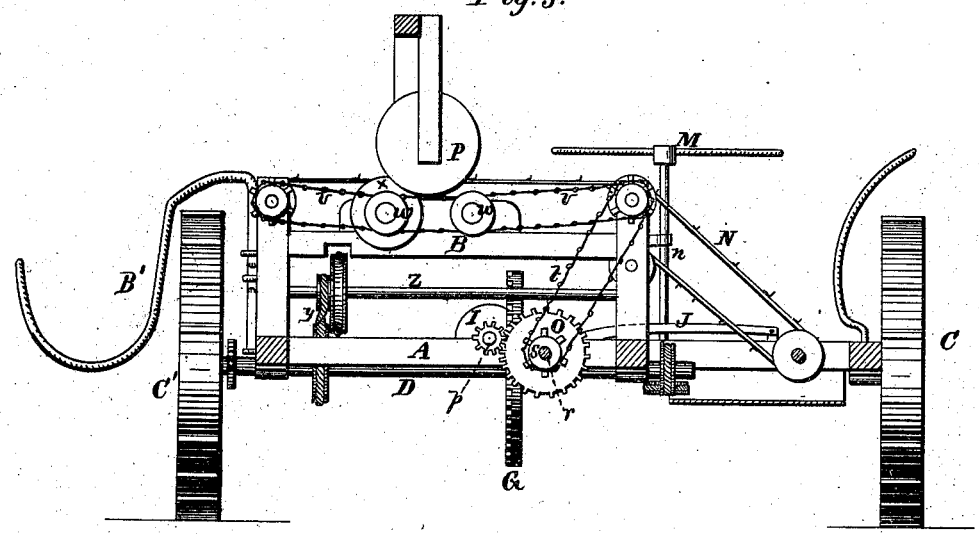

In the accompanying drawings, Figure 1 is a perspective view of my machine. Fig. 2 is a side elevation of the same. Fig. 3 is a longitudinal section through the line $x\,x$, Fig. 2, and Fig. 4 shows one of the hooks for collecting and dropping the shocks of corn-stalks. Fig. 5 is a sectional view, showing the device for connecting and disconnecting knife with the motive power.

A represents the bottom or main frame of my machine, above which is another frame, supported from it by suitable posts. C C' are the two driving-wheels, the wheel C at the right-hand side of the machine being placed on a suitable spindle, while the left-hand wheel, C', is, by an ordinary ratchet device, connected to an axle or shaft, D, having its bearings in boxes on the under side of the main frame A. E represents the tongue, hinged to a metal bar, $a$, which is fastened to the main frame A, and the tongue is also pivoted between two braces, $b\,b$. From the rear end of the tongue E extends a notched pivoted lever, $d$, through a slot in the plate or bar $a$, and held by a spring, $e$. This forms a well-braced triangular support, that admits of the raising and lowering of the machine, as required. On the shaft D is a large master-wheel, G, which, through a pinion, $f$, runs a shaft, $h$, which is located in the frame A upon a line with the tongue E. The pinion $f$ is loose upon the shaft, and connected to a rod, $k$, by a suitable fork, $i$, placed in a circumferential groove on the hub of the pinion. The rod $k$ runs in suitable bearings on the main frame, and is, by a short rod, $m$, connected with an elbow-lever, H, by means of which the pinion is thrown in and out of gear with the master-wheel G. By the elbow-lever H and rod $m$, the rod $k$ is locked when the pinion $f$ is engaged with the master-wheel G. On the front end of the shaft $h$ is a crank-wheel, I, connected by a pitman, J, with the double-edged cutter, K, which is pivoted and turns on a center-pin above and between the two stationary cutters L L.

The stalks as they are cut by the knives K L, are thrown by a revolving reel, M, onto an ordinary endless carrier, N. The reel M is adjustably attached upon an upright shaft, $n$, which is revolved by a belt or chain from a pulley on the shaft or axle D. The carrier N is arranged as shown, passing around a roller at the right side of the main frame A, and around rollers in the upper frame, B, and it is kept in motion from the shaft $h$ by a pinion, $p$, upon its end, gearing with a cog-wheel, O, on a counter-shaft, $r$. On this shaft is a toothed pulley, $s$, connected by a chain, $t$, with a pulley upon the journal of one of the upper carrier-rollers. The two upper carrier-rollers are connected by a chain, $v$, passing around pulleys on their journals. The upper part of this chain passes over two idle pulleys, $w\,w$, and between said pulleys, above the chain, is a grooved wheel, P, against the under side of which the chain bears. As the broom-corn is carried up by the carrier N, it passes between the wheel P and chain $v$, when the tops are cut off by a cutter $x$, made in circular form, and attached to the side of the left pulley $v$. In the rear part of the machine is a casing, R, the upper side of which corresponds with the top of the carrier N, and this casing contains a seed-box, S, in the upper part of which is a revolving thrashing-cylinder, T. This cylinder obtains its motion from the shaft or axle D by a cross-belt, $y$, from a pulley on the same communicating motion to a counter-shaft, $z$, and a belt, $a'$, from a pulley on this shaft connecting with a pulley on the cylinder-shaft. The tops of the broom-corn, after being thrashed by the cylinder T, are immediately cut off by the circular revolving cutter $x$. The spikes of the cylinder are set in inclined rows, and project through the top of the casing R, the seeds passing into the seed-box S, while the corn is to be tied up by a man standing upon the platform V. W is a platform, upon which a man stands to straighten the corn as it is taken up by the carrier, so as to be topped by the cutter x. The bottom of the seed-box S is provided with a sliding or other bottom, b', which can be easily opened to allow the seed to fall out at the end of the field.

For the purpose of shocking broom-corn, there is arranged two curved hooks, A' and B', at the left side of the machine. The hook A' is at the front end, and pivoted in such a manner that it can be dropped downward by the aid of a lever, D', and the hook B' is in rear of the axle D, and turns in bearings in such a manner that it can be thrown backward out of the way. The vertical part of this hook between the bearings is provided with an arm, which is connected by a rod, d', with a lever, E'.

Both the hooks A' and B' being thrown in proper position to receive the corn-stalk as it falls off from the carrier N, they are to remain so until a shock is collected thereon. By means of the lever D' the hook A' is dropped, lowering the butt end of the shock to the ground, and as soon as the machine has moved forward three or four feet the hook B' is thrown back, leaving the shock standing and the machine can pass it, when the hooks are again at once thrown outward in position.

Having thus fully described my invention, what I claim as new, and desire to secure by Letters Patent, is—

1. The triangular support $a\ b\ b$, projecting from the frame A, carrying the tongue E, hinged at its forward end, in combination with locking-lever $d$, spring-support and spring $e$, substantially as shown and described.

2. The combination, with the carrier N, of the chain $v$, pulleys $w\ w$, grooved wheel P, and cutter $x$, all constructed and arranged to operate substantially as and for the purposes herein set forth.

3. In a broom-corn harvester and thrasher, the combination of a thrashing-cylinder, T, wheel P, and cutter $x$, with the carrier N, substantially as shown and described.

4. The hooks A' and B', arranged as described, and operated by means of their respective levers D' and E', substantially as and for the purposes herein set forth.

In testimony that I claim the foregoing as my invention I hereunto affix my signature this 22d day of May, 1874.

R. C. HINTON.

Witnesses:
  SAML. T. INMAN,
  JNO. M. RAGLAND.